May 20, 1924.
E. RANSOM ET AL
1,494,974
RACING DOG DECOY
Filed Dec. 7, 1922
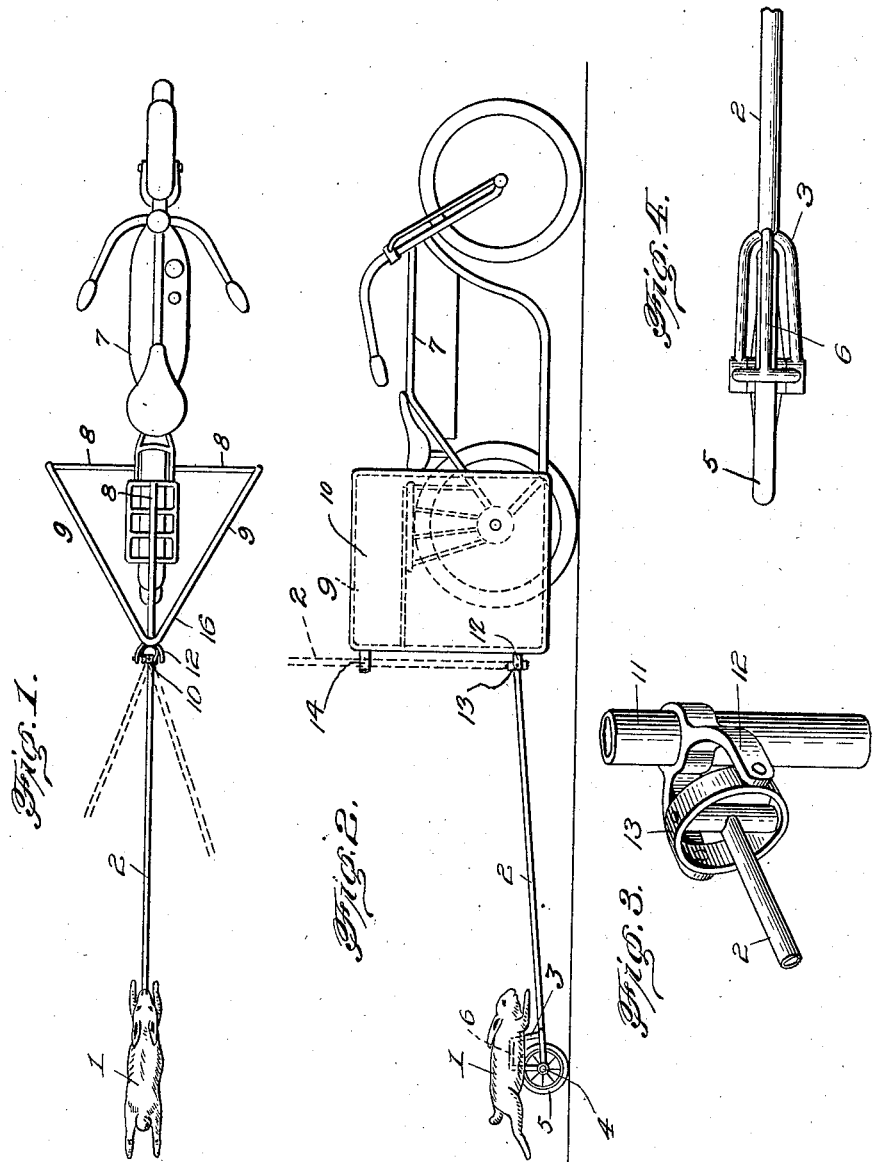
INVENTOR.
E. Ransom.
Anderson Ransom.
BY
Geo. P. Kimmel. ATTORNEY.

Patented May 20, 1924.

1,494,974

UNITED STATES PATENT OFFICE.

ED RANSOM AND ANDERSON RANSOM, OF HASTINGS, NEBRASKA.

RACING-DOG DECOY.

Application filed December 7, 1922. Serial No. 605,393.

*To all whom it may concern:*

Be it known that we, ED RANSOM and ANDERSON RANSOM, citizens of the United States, residing at Hastings, in the county of Adams, and State of Nebraska, have invented certain new and useful Improvements in Racing-Dog Decoys, of which the following is a specification.

This invention has reference to racing dog decoys, and its object is to provide means whereby racing dogs are induced to follow a decoy about a course to train the dogs.

In accordance with the invention, there is provided a semblance of a decoy animal which may be drawn or driven about a track to cause the dog or dogs to follow the decoy in order to train them.

The decoy is inanimate and may resemble a game animal and is caused to travel about the track by power which may be supplied by human beings hidden from the sight of the animals being trained, whereby the decoy may be kept within sight of the animals to entice them to their greatest efforts and then when the training is accomplished, the decoy is withdrawn from the sight of the animals.

The invention will be best understood from a consideration of the following detailed description taken in connection with the accompanying drawing forming part of this specification, with the understanding that the invention is not confined to any strict conformity with the showing of the drawings, but may be changed and modified so long as such changes and modifications mark no material departure from the salient features of the invention as expressed in the appended claims.

In the drawing:—

Figure 1 is a plan view of a motor driven decoy device said decoy, as here shown, being drawn by a motorcycle, Fig. 2 is an elevation of the device shown in Fig. 1.

Figs. 3 and 4 are detailed views of portions of the structure.

In accordance with the invention, there is provided a decoy device 1, which may be in the similitude of a running game animal, such, for instance, as a hare and may actually consist of the stuffed body of a hare in running position.

The hare 1 is mounted on a tubular member 2 bifurcated at its end as at 3 and carrying between the furcations an axle 4 which in turn carries a supporting wheel 5.

The tubular member 2 has mounted at its bifurcated end an arch structure 6 above the wheel 5, upon which the hare is supported.

The decoy is drawn by a motorcycle 7, the rear of which is within, and secured by braces 8 to a V-shaped screen frame 9, which as shown extends from a point near the ground upward above the top of the machine. Over this frame is secured canvas 10, or other suitable material, thus effectively shielding the machine from the view of the dogs following the decoy.

A vertical post 11, is secured between the top and bottom of the frame at its apex and has attached thereto, near its bottom, a substantially U-shaped yoke 12, the arms of which extend out from the post at right angles as shown. Between these arms is placed a universal connection 13, connecting with the other end of the decoy carrying member 2. At the upper end of the post 11, is secured an outstanding spring clip 14, which is parallel with the member 12, between which clips the member 2 is adapted to be placed when raised from the horizontal to a vertical position.

The tubular member 2 is of sufficient length to carry the hare 1 at its rear end at an appropriate distance from the motorcycle 7, with the hare but a short distance above the ground, which ground may represent the ground surface of a race track, and the hare is supported at an appropriate distance from the motorcycle to make it appear that the hare is coursing along the race course at a sufficient distance from the shield or blind 10 to make it appear to the dogs in the race course that the hare is freely running along the course, thus effectively deceiving the dogs into freely following the moving hare and inducing the dogs to put forth their best efforts to overtake the hare.

By shielding the motorcycle from observation of the dogs, the presence of the motorcycle, being unobserved by the dogs, does not disturb the running of the dogs after the hare as a lure, and the dogs are therefore enticed into putting forth their best efforts to overcome the hare.

To maintain the deception so far as the dogs are concerned, provision may be made for withdrawing the hare from observation behind a blind at the end of the course.

While the noise of the motorcycle will be evident to the dogs, the latter are not disturbed by such noise, for the motorcycle itself is hidden from view and the dogs in the excitement of the chase will be attracted by the appearance of the hare only, which hare has the similitude of a live hare in plain view of the dogs who therefore do not observe the motorcycle and the connection 2 thereto.

The structure of the invention is such that the hare is maintained within sight of the dogs while the motorcycle is of sufficient power to propel the hare along the race course in full sight of the dogs stimulating their efforts to overtake the hare, which latter may be readily maintained within sight of and kept just beyond the reach of the dogs, thus stimulating their excitement and their efforts to overtake the hare.

The dummy hare being under the sole control of the rider of the motorcycle, which rider is hidden from direct view of the dogs, does not distract the attention of the dogs but leaves them free to follow the lure of the hare.

Moreover, the propelling force for the hare is due to the presence of the motorcycle and the latter is fully under the control of the rider of the vehicle so that the speed of the hare may depend entirely upon the volition of the rider of the vehicle, and the hare may be propelled with greater or less speed as necessity requires to outstrip the dogs.

The decoy mounted on a small wheel close to the ground and connected to one end of a motorcycle is of very simple construction and may be installed anywhere with the motorcycle completely hidden from the dogs behind a canvas screen and also attached to the motorcycle frame by a universal joint. Moreover at the end of the course the hare may be run under a canvas blind and concealed.

What is claimed is:—

1. A racing dog training device comprising a miniature figure constituting a decoy, a wheeled support therefor, an arm extending forwardly of said support, a self propelled vehicle adapted to be controlled by a rider, a vertical screen carried by and opposing said vehicle, and a loose connection between the free end of said arm and the rear end of said screen.

2. A racing dog training device comprising a miniature figure constituting a decoy, a wheeled support therefor, an arm extending forwardly of said support, a self propelled vehicle adapted to be controlled by a rider, a vertical screen enclosing the rear portion of said vehicle and supported therefrom and a loose connection between the free end of said arm and the rear end of said screen.

3. A racing dog training device comprising a miniature figure constituting a decoy, a wheeled support therefor, an arm extending forwardly of said support, a self propelled vehicle adapted to be controlled by a rider, a vertical screen enclosing the rear portion of said vehicle and supported therefrom, a vertical post carried by said screen at its rear, a yoke carried by said post near its lower end, an annulus pivoted between the arms of said yoke, and a pivotal connection between the free end of said arm and said annulus.

In testimony whereof, we affix our signatures hereto.

ED RANSOM.
ANDERSON RANSOM.